United States Patent [19]

Ensberg et al.

[11] Patent Number: 5,975,855

[45] Date of Patent: Nov. 2, 1999

[54] METHOD AND APPARATUS FOR INCREASING CHANNEL PLASMA DENSITY IN AN MHD VACUUM PUMP

[75] Inventors: Earl S. Ensberg; Gary L. Jahns, both of San Diego, Calif.

[73] Assignee: Microwave Plasma Products, Inc., San Diego, Calif.

[21] Appl. No.: 08/758,698

[22] Filed: Dec. 3, 1996

[51] Int. Cl.[6] .................................................. H02K 44/02
[52] U.S. Cl. ................... 417/49; 417/50; 417/53; 310/11
[58] Field of Search ................... 417/49, 50, 53; 310/11

[56] References Cited

U.S. PATENT DOCUMENTS 5,165,861  11/1992  Jahns ........................................ 417/50
5,370,765  12/1994  Dandl ....................................... 156/643

*Primary Examiner*—Timothy S. Thorpe
*Assistant Examiner*—Cheryl J. Tyler

[57] ABSTRACT

Flat, insulated, metallic strips ("applicators"), are fixed to the wider sides of each permanent magnet assembly in the channel array of a Magnetohydrodynamic (MHD) Vacuum Pump. Electromagnetic power from an external rf/microwave generator is delivered by an appropriate transmission line to each pair of applicators, providing an rf/microwave electric field, generally parallel to the magnetic field of the magnets, across each channel in the array. As the plasma ions and electrons formed by the rf/microwave field lose energy by collisions with the channel surfaces and by collisions with neutral molecules in the channel, the microwave electric field reheats the plasma throughout its passage through the length of the channel array, increasing plasma density and enabling the use of much longer channels, thus increasing the throughput and compression ratio in the MHD Vacuum Pump.

8 Claims, 4 Drawing Sheets

METHOD AND APPARATUS FOR INCREASING CHANNEL PLASMA DENSITY IN AN MHD VACUUM PUMP

BACKGROUND—FIELD OF THE INVENTION

This invention relates to the technology of removing gas or vapor from a vacuum chamber, specifically by forming a plasma (space-charge neutral mixture of free electrons and ions) in the gas, and driving a current density j through the plasma, normal to the local magnetic field B, to generate a magnetohydrodynamic (MHD) pressure gradient vector j×B, to transport the plasma and vapor or background gases toward an outlet orifice.

BACKGROUND—DESCRIPTION OF PRIOR ART

Vacuum is usually achieved by removing the atmosphere from a chamber by means of a positive-displacement mechanical pump or "backing pump." Low pressure is officially measured in SI units of Pascals (Newtons/meter$^2$) and more commonly in Torr. Mean atmospheric pressure is $1.013 \times 10^5$ Pascals or 760 Torr. Since backing pumps lose efficiency as inlet pressures fall, the achievement of higher vacuum (lower pressures) than roughly 0.01 Torr, requires another type of pump (a molecular compressor) to concentrate the residual gas at the inlet orifice of the backing pump. Industrial applications of vacuum technology include preparation of thin films, as for example in the manufacture of large scale integrated electronic circuits, where the goal of small feature size requires the cleanliness available only in a vacuum.

Many molecular compressor concepts are described in vacuum engineering textbooks (e.g., S. Dushman, *Scientific Foundations of Vacuum Technique,* 2nd ed. [John Wiley & Sons, 1962] or John F. O'Hanlon, A User's Guide to Vacuum Technology, 2nd Ed.[John Wiley & Sons, 1989]). For example, "diffusion pumps" entrain the residual gas molecules in a foreign vapor (heavy oil or mercury). The use of such pumps is limited by the back streaming of the foreign vapor, which gradually contaminates all surfaces within the chamber being evacuated. "Turbomolecular pumps" transfer momentum to gas molecules by collisions with fragile turbine blades. Potentially cleaner than diffusion pumps, turbomolecular pumps are less resistant to mechanical shock and, because of the limited strength of turbine blade materials, cannot be increased in size to compete with large diffusion pumps. "Cryogenic pumps" store the effluent gasses in the frozen state. In an industrial processing application, cryogenic pumps require significant downtime for regeneration after the accumulated throughput saturates the cold absorbent material.

Several previous attempts have been made to compress the molecular species by forming a plasma in the gas. By the word plasma is meant the state of matter where atoms have been ionized, resulting in a gas of electrically charged (but space charge neutral) ions and electrons. One application of plasmas to vacuum pumping in the prior art is described in U.S. Pat. No. 4,641,060 issued Feb. 3, 1987 to R. A. Dandl, entitled "Method and Apparatus using Electron Cyclotron Heated Plasma for Vacuum Pumping." Since the latter concept depends on mean free path lengths for ions and electrons that are comparable to the length of the apparatus, it is not applicable for intermediate gas pressures (greater than of the order of one millitorr).

The present invention represents an improvement over the concept of the invention described in U.S. Pat. No. 5,165, 861 issued Nov. 24, 1992 to G. L. Jahns entitled "Magnetohydrodynamic Vacuum Pump." The MHD Vacuum Pump employed the Lorentz force to sweep plasma from the inlet region, where plasma was formed by electron cyclotron heating, through a structure of parallel channels to the outlet region. Within the channel structure, columns of permanent magnets provided the required magnetic field. The MHD Vacuum Pump described in that patent specification failed in full-scale models, because (a.) the plasma formed in the fringing fields of the channel structure was not efficiently collected into the high field regions of the gas channels, and (b.) in gas channels of greater length, collisions of the plasma with channel wall surfaces extinguished the plasma within the channel.

OBJECTS AND ADVANTAGES

An object of this invention is to develop a molecular compressor without mechanical moving parts, having modular construction, for the purpose of increasing the maximum gas throughput by forming and heating plasma throughout the length of parallel gas channel structures. High throughput is an advantage for industrial processes in which economic value of the product is proportional to the flow rate of gaseous reagents or products of a reaction pumped through the vacuum chamber.

A further object of this invention is to extend the maximum operating range of the MHD Vacuum Pump to pressures of the order of 1 Torr by establishing rf or microwave electric fields everywhere within each gas channel, with selection of frequency to develop the maximum gas throughput at each operating pressure.

List of Reference Numerals

| | |
|---|---|
| 2. electrode plates | 4. channel structure |
| 6. typical magnet slot | 8. typical magent assembly |
| 10. typical gas channel | 12. magnetic polarization direction |
| 13. typical magnetic vectors B | 14. permanent magnet |
| 15. typical electrode insulators | 16. insulating magnet shell |
| 18. magnet retainer | 20. typical set screw |
| 22. typical rf/microwave applicator | 24. coupling circuit |
| 26. rf/microwave transmission line | 28. cylindrical vacuum envelope |
| 30. inlet flange | 32. outlet flange |
| 34. inlet baffle | 36. typical coaxial vacuum feedthrough |
| 38. backing pump flange | 40.outlet orifice |
| 42. outlet barrel | 44. water-cooled mother board |
| 46. cooling jacket | |

SUMMARY

This invention improves the concept of a rugged MHD Vacuum Pump by providing high frequency electric fields, parallel to the magnetic fields within the gas channels to maintain the plasma throughout the length of the channel structure.

DESCRIPTION OF THE INVENTION

The invention utilizes an rf/microwave applicator 22, formed by bonding a thin metal foil, covered by a thin layer of dielectric, to each of the wider sides of each magnet shell 16, as shown in FIG. 2A and FIG. 2B. Conventional loop coupling circuits 24 (cf. classic texts, e.g., J. C. Slater, *Microwave Transmission,* reprinted by Dover Publications, New York, 1959 or Theodore Moreno, Microwave Transmission Design Data, reprinted by Dover Publications, New York, 1958) deliver the power from an rf/microwave transmission line 26, to each rf/microwave applicator pair, as shown in FIG. 3. The transmission line is electrically shielded to prevent formation of plasma or radiation of electromagnetic power outside of the channel structure.

Figure 2:
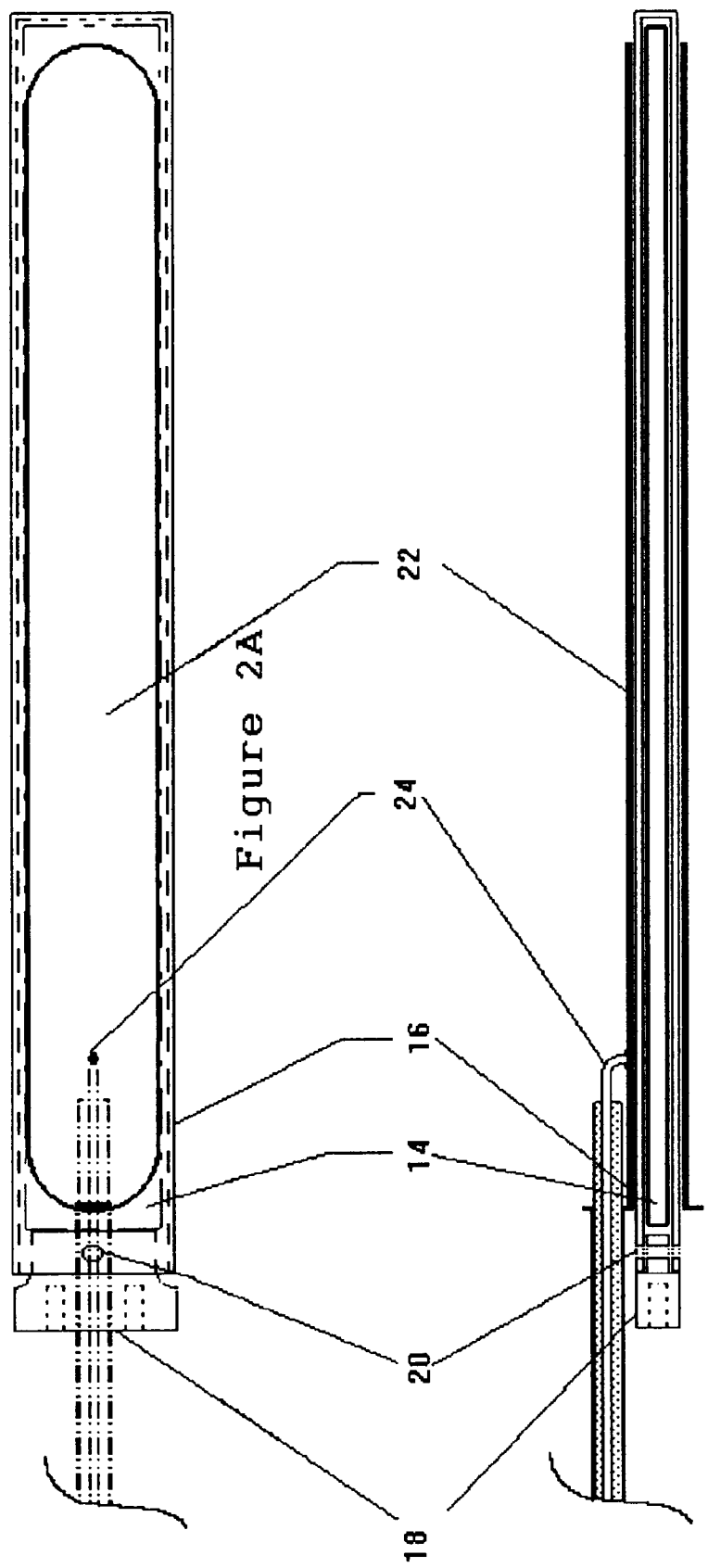
FIG. 2A shows a view of the top of a single magnet assembly, with a typical rf/microwave applicator attached.
FIG. 2B shows a cross section of the magnet assembly and applicator in the plane of symmetry perpendicular to FIG. 2A.
Figure 3:
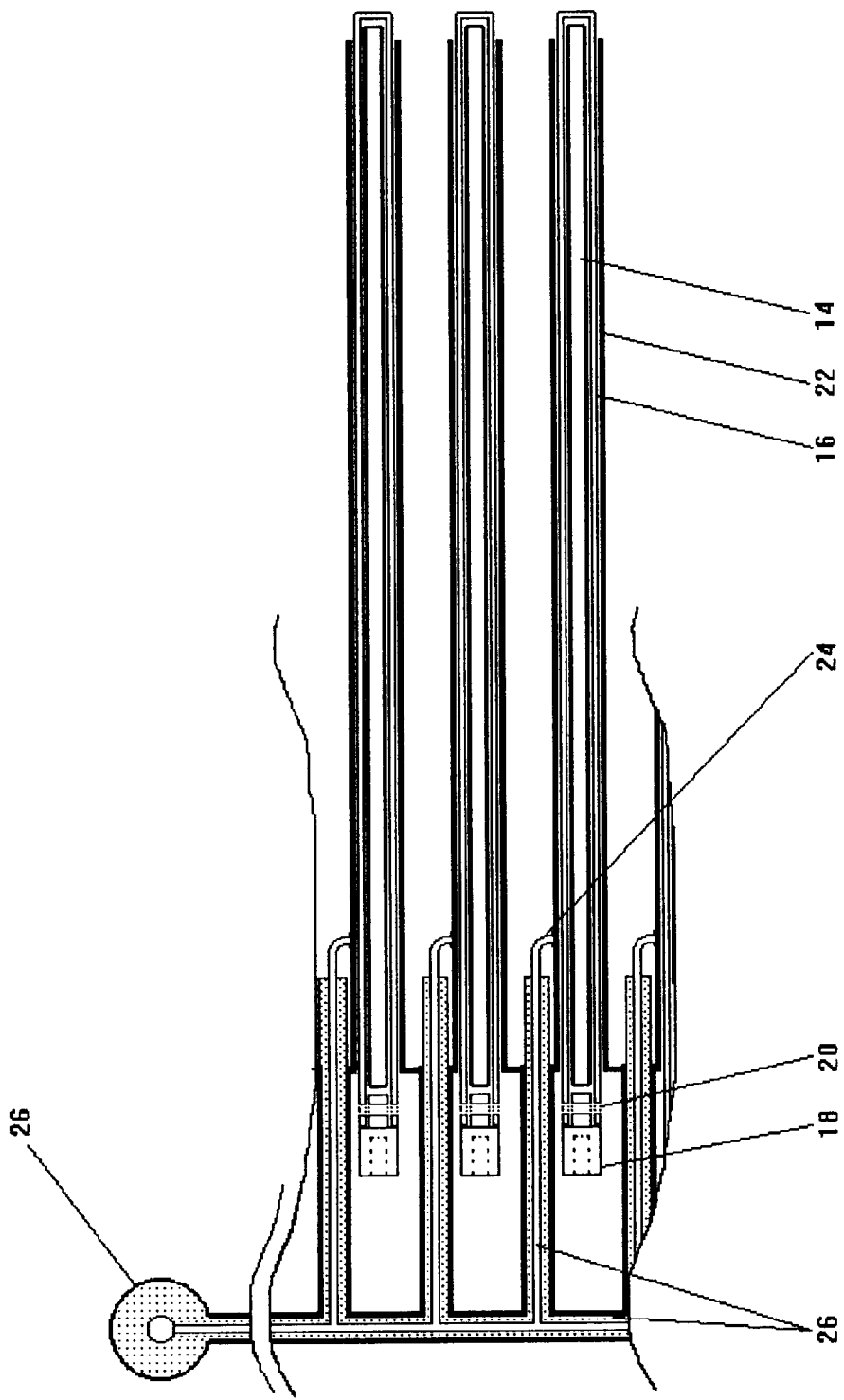
FIG. 3 shows a cross sectional view of magnet assemblies and applicators in a typical column, with a typical section of the coaxial transmission line.

Each magnet assembly, shown in plan view in FIG. 2 A, comprises a thin, rare earth permanent magnet (or permanent magnet segments) 14, trapped in a thin-walled insulating magnet shell 16 by a magnet retainer 18. An rf/microwave applicator 22 is attached to the top and bottom surface of the insulating magnet shell 16. The retainer is attached to the insulating magnet shell by set screws 20. The permanent magnet material is electrically non-conductive. Threaded holes in the end of the magnet retainer are provided to attach the magnet assembly to supporting structure.

The cross section in FIG. 2B more clearly distinguishes the components of FIG. 2A from each other and illustrates one coupling circuit 24 for delivering power from the coaxial rf/microwave transmission line 26 to the stripline formed by pairs of rf/microwave applicators 22 (a coupling method appropriate for the case of a 2.45 gHz microwave source).

Figure 1:
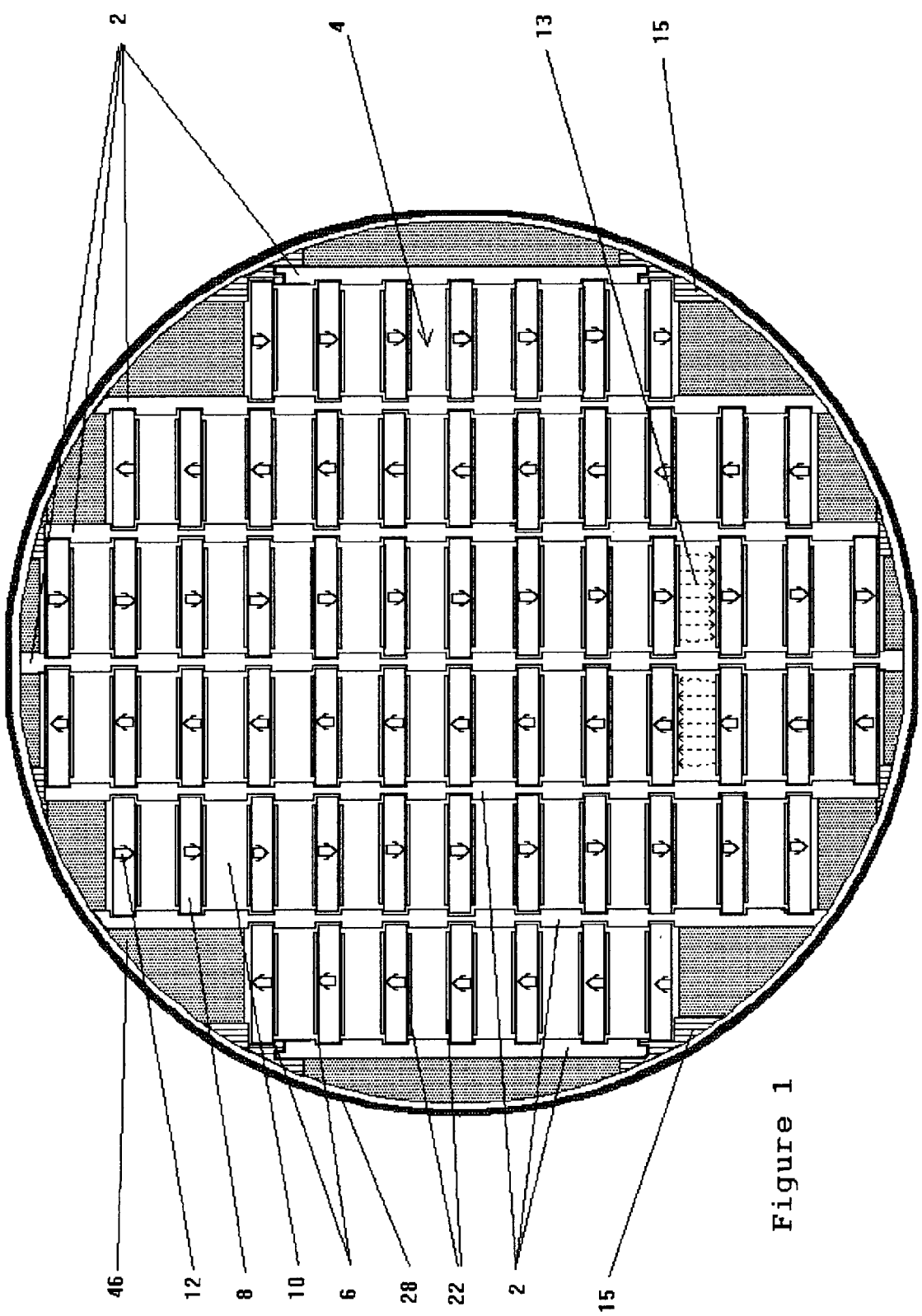
FIG. 1 shows a cross sectional view of a typical portion of the channel structure, in a plane perpendicular to the longitudinal axis of the cylindrical vacuum envelope.
Figure 4:
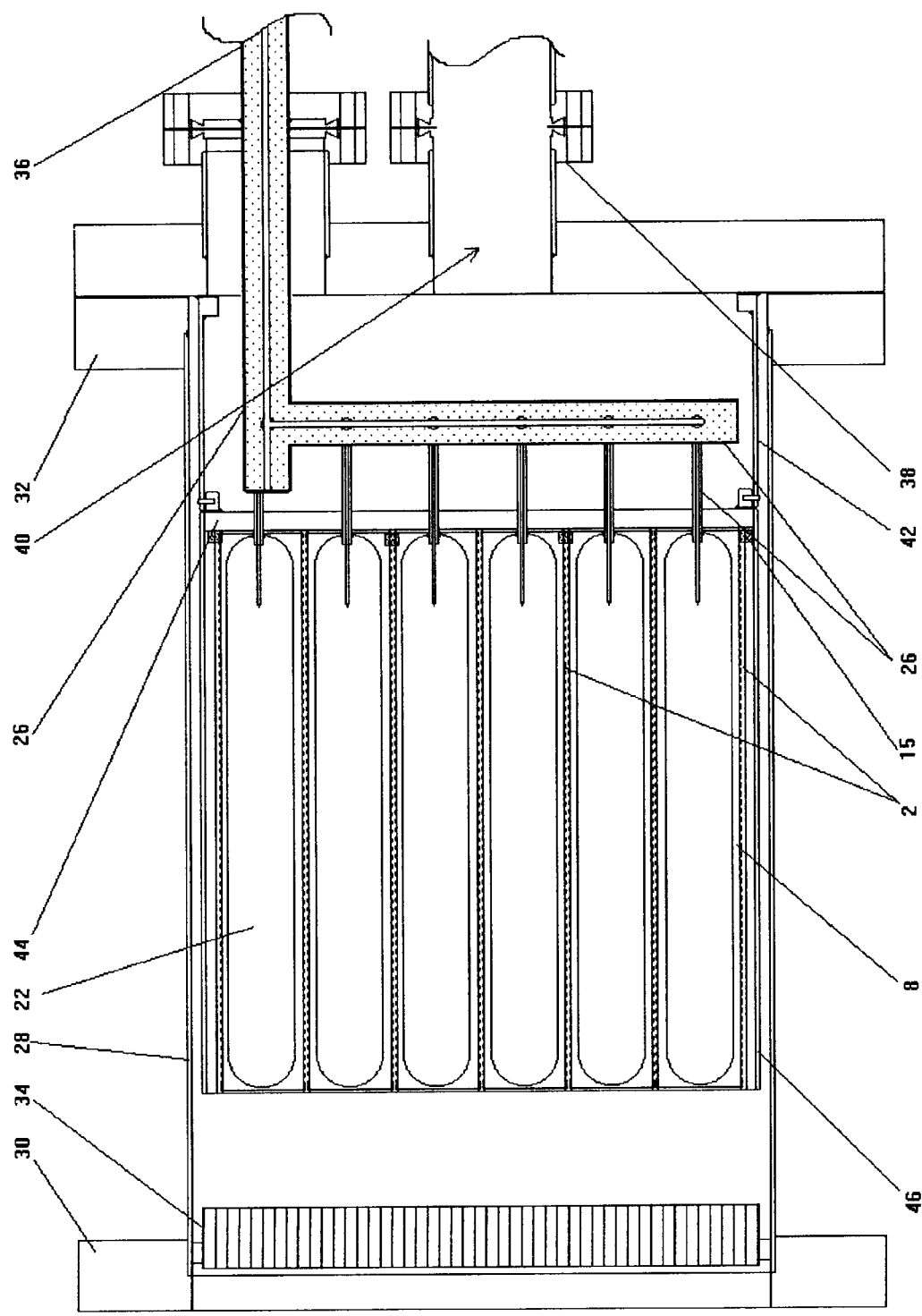
FIG. 4 shows a cross section of the MHD Vacuum Pump in a plane containing the longitudinal axis of a preferred embodiment.

The relationship of the invention to the MHD Vacuum Pump can be seen in FIGS. 1 and 4. The array of magnet assemblies 8, with rf/microwave applicators 22, and electrode plates 2, mounted parallel to each other, shape the channel structure 4, shown in cross section in FIG. 1. Slots 6 are cut in the electrode plate surfaces at regular intervals. A magnet assembly 8 is inserted between adjacent electrode plates, into each pair of slots. A gas channel 10, bounded by each pair of electrode plates and magnet assemblies, extends through the channel structure. All the materials of the channel structure that could be exposed to the effluent vapor are formed of chemically inert materials.

A cylindrical vacuum envelope 28 in FIG. 4 is formed of a thin-walled metal tube, welded to an inlet flange 30 at one end, and an outlet flange 32 at the other. An inlet baffle 34, supported at the inlet flange, reduces propagation of stray rf/microwave beyond the inlet flange. Vacuum feedthrough fittings are mounted in the outlet flange to provide access for diagnostic instruments, coolant lines and pressure gauges, as well as power lines (such as the coaxial vacuum feedthrough 36). A backing pump flange 38 facilitates the connection of a backing pump and an outlet orifice 40.

In this preferred embodiment, all internal components are mounted on the inlet and outlet flanges for easy disassembly. An outlet barrel 42, in which the effluent gas accumulates at the outlet orifice, is welded to the interior surface of the outlet flange. A motherboard 44 is attached to the barrel. In this embodiment, the motherboard provides mechanical support for the electrode plates, for the magnet assemblies and for the cooling jacket 46. The motherboard also provides coolant for the water jacket and all electrical connections for the channel structure. An array of openings must be provided in the motherboard for the unobstructed flow of gas from the gas channels to the outlet barrel. To reduce backstreaming, the channel structure must block any unobstructed path for gasses other than the gas channels in which plasma is formed.

From this description, the structure, itself, illustrates three advantages in this embodiment of the rf/microwave applicators 22 and rf/microwave transmission line 26:

a. The coaxial transmission line and the compact structure of the rf/microwave applicators, as opposed to the waveguide structure in the original MHD Vacuum Pump, reduces the volume of the MHD Vacuum Pump, and the ease of installation.

b. The stripline character of the rf/microwave applicators permits their insertion into the channel array without disturbing the modularity of magnets and channels.

c. The light weight, compact structure of the rf/microwave applicators and transmission line preserves the ruggedness and the independence of orientation of the MHD vacuum pump.

OPERATION OF THE INVENTION

In use, the cells of the inlet baffle function as waveguides beyond cutoff, preventing the propagation of electromagnetic radiation to the remainder of the vacuum system. For the wavelengths contemplated in this invention, the inlet baffle causes very little reduction in gas flow.

Rf or microwave power distributed by conventional transmission lines 26, is coupled to each pair of applicators 22. Electric fields are thus established between applicators, in a direction generally parallel to the magnetic field vector B 13. These electric fields partially ionize the gas and maintain the resulting plasma along the whole length of each gas channel in the channel structure 4 (shown in FIG. 3 and FIG. 4). The dielectric coating of the rf/microwave applicators 22 must be thin enough to present a relatively small capacitive reactance to the flow of rf current through the plasma at the frequency chosen for the application.

The choice of frequency of the rf electric field depends on the pressure range in which the MHD Vacuum Pump is expected to operate. Lower rf frequencies form plasma effectively at pressures where the minimum in the Paschen curve corresponds to dimensions smaller than the height (about 7 mm in this preferred embodiment) of the gas channel (cf. Joseph L. Cecchi's review article, "Introduction to Plasma Concepts and Discharge Configurations," *Handbook of Plasma Processing Technology,* ed. by S. M. Rossnagel, J. J. Cuomo and W. D. Westwood, Noyes Publications, 1990; p.50). Frequencies allocated for industrial use at 400 kHz or 13.56 mHz work well at pressures of the order of 1 Torr. At lower pressures, plasma is more effectively formed by a microwave (e.g., 2.45 gHz) field.

The shape of the gas channels in the channel structure is chosen to reduce backstreaming of neutral gas from the outlet to the inlet of the channel structure. The ability to maintain plasma by rf/microwave applicators extending the entire length permits the use of longer channels, and correspondingly smaller backstreaming. Flow conductance formulas are reviewed in Dushman for molecular flow, viscous flow and the transition ranges of pressures. The design varies with the Knudsen number for the pressure range in which the pump is expected to have maximum compression ratio.

Since the water jacket, motherboard, barrel and exit flange form a gas-tight boundary and all the parts may be mounted on the outlet flange and the rf/microwave fields are well shielded, the pump may be inserted nude into a vacuum system, without the vacuum envelope. The throughput of the system can generally be increased by this method.

CONCLUSION, RAMIFICATION AND SCOPE

This description should suffice to clarify the advantages of increasing the plasma density in an MHD Vacuum Pump by the use of applicators extending throughout the length of each channel in the channel array.

While the above description contains many specificities, these should not be construed as limitations on the scope of the invention, but rather as an example of one preferred embodiment thereof. Many other variations are possible. The channel structure configuration can be created by other combinations of electrodes, and magnets. Other means of forming the plasma within the entire volume of each gas channel are contemplated within the scope of this invention. The addition of diagnostic instruments for use with a pump control system, would be a logical extension of these ideas, since the concept permits rapid adjustment of the operating electromagnetic fields of the MHD Vacuum Pump. Many other transmission line concepts, well-known to engineers in the microwave industry, would be within the scope of this invention.

Accordingly, the scope of the invention should be determined not by the embodiments illustrated, but by the appended claims and their legal equivalents.

We claim:

1. A method for transporting gas in a high vacuum environment, by positioning a channel array of an MHD vacuum pump in a vacuum envelope, with channel axes directed generally from an inlet region to an outlet region, while establishing a steady transverse magnetic field and a steady plasma current density j transverse to the magnetic field vectors B and to said channel axes, wherein the improvement comprises the steps of:

(a.) inserting a stripline formed of a pair of applicators extending along a length of each channel, without obstructing either gas or plasma flow, (b.) covering said applicators with a dielectric coating to permit a flow of rf/microwave currents to heat the plasma while blocking any steady state currents which would short out the transverse plasma current density j, (c.) matching the characteristic impedance of said stripline to a coupling means by which rf/microwave electromagnetic waves from an external power source propagate throughout the length of each channel, whereby plasma is formed throughout the interior of each channel, increasing the pressure difference, and the compression ratio, between said outlet region and said inlet region of the MHD vacuum pump.

2. The method of claim 1, further including the step of providing metallic shielding around said coupling means and associated transmission line components external to said channel array, sufficient to prevent formation of plasma anywhere outside said channels, thereby increasing both the efficiency and reliability of said MHD vacuum pump.

3. The method of claim 1, further including the step of adjusting said coupling means to efficiently deliver power to said stripline at one of the frequencies in the radio frequency band, including the microwave band of the spectrum, selected to optimize MHD vacuum pump operation at the operating pressure required in different applications.

4. A method of increasing the ratio of pressures at an outlet region and an inlet region of an MHD Vacuum Pump by welding an outlet barrel to the outlet flange of a vacuum envelope, fitting to said outlet barrel a channel array comprising an array of parallel channels, generally directed from the inlet region of said vacuum envelope to said outlet barrel, and permanent magnets to provide the magnetic field B transverse to the channel axes, wherein the improvement comprises the steps of:

(a.) increasing the length of said channel array, (b.) introducing applicators throughout said length of each channel to permit electromagnetic waves in the radio frequency band, including the microwave band of frequencies to propagate throughout the interior of said channel, without impeding the flow of gases through the channels, (c.) coupling an rf/microwave power source to said applicators to form and heat plasma throughout the length of said channel array and only in said channel array, said plasma conducting a steady transverse plasma current density j, whereby effluent gasses accumulate in the outlet barrel, backstreaming from the outlet barrel is decreased and the Lorentz force, j×B, is integrated over greater length, increasing the compression ratio.

5. The method of claim 4, further including the step of selecting a frequency for said rf/microwave power which optimizes plasma production at both the inlet and the outlet ends of said channel array.

6. An apparatus for more efficiently transporting gas in a high vacuum environment comprising:

(a.) a channel array of an MHD vacuum pump positioned in a vacuum envelope, wherein the axes of said channel array are generally directed from an inlet region to an outlet region, (b.) magnet assemblies positioned in the channels of said array, generating a transverse magnetic field B, each said magnet assembly comprising a long, thin permanent magnet surrounded by a thin insulating shell, (c.) applicators inserted between and coupled to said magnet assemblies, said applicator comprising a thin conducting sheet, bonded to the faces of each said insulating shell and insulated from plasma by a refractory dielectric coating, so as to form an internal transmission line in each said channel, directing high frequency electric fields generally parallel to the magnetic fields, (d.) transmission lines and conventional coupling circuits, connecting said applicators to an rf/microwave power source, forming a plasma within said channels, (e.) electrodes which deliver a steady electric current density j generally transverse to the axis of each channel in said channel array, as well as to the transverse magnetic field B such that the resulting j×B forces exerted on plasma are generally directed from said inlet to said outlet region, whereby substantially all of said plasma is formed and maintained throughout the length of said channels, as said plasma and neutral gas collisionally drift together toward said outlet region.

7. The apparatus for vacuum pumping of claim 6, further comprising adjustable coupling circuits to efficiently deliver power by said coupling circuits and associated transmission lines at frequencies selected for different operating pressure ranges.

8. The apparatus for vacuum pumping of claim 6, further comprising (a.) inert metallic surfaces of said electrodes, so as to be resistant to chemical and thermal attack by corrosive chemicals and high ion temperatures, (b.) chemically inert magnet shells, said magnet shells electrically insulating and capable of conducting heat to protect said permanent magnets from exceeding the Curie temperature for said permanent magnets whereby high plasma electron temperatures are maintained throughout the volume of each gas channel, without impairing the performance of the pump.

* * * * *